United States Patent [19]

Karas et al.

[11] Patent Number: 4,944,991

[45] Date of Patent: Jul. 31, 1990

[54] FORMATION OF ALUMINA IMPREGNATED CARBON FIBER MATS

[75] Inventors: Bradley R. Karas, Amsterday; Robert W. Powers, Schenectady, both of N.Y.

[73] Assignee: Electric Power Research Institute, Palo Alto, Calif.

[21] Appl. No.: 216,890

[22] Filed: Jul. 8, 1988

[51] Int. Cl.$^5$ .................... C25B 11/06; B32B 9/04
[52] U.S. Cl. .................... 428/408; 204/291; 204/294; 427/113; 427/226; 427/343; 428/242; 428/283; 428/328; 428/329; 428/902
[58] Field of Search ............ 428/408, 283, 329, 902, 428/242, 328; 427/113, 226, 343; 204/291, 294

[56] References Cited

U.S. PATENT DOCUMENTS

| | | |
|---|---|---|
| 2,859,139 | 11/1958 | Ramadanoff ........................ 428/408 |
| 3,355,317 | 11/1967 | Keith, II et al. ..................... 428/408 |
| 3,941,899 | 3/1976 | Kugler et al. ....................... 427/113 |
| 4,206,263 | 6/1980 | Reiger et al. ....................... 427/113 |
| 4,282,288 | 8/1981 | Yoshino et al. ..................... 428/408 |
| 4,399,185 | 8/1983 | Petrow ............................... 428/283 |
| 4,544,472 | 10/1985 | Reven ................................ 204/294 |

Primary Examiner—Ellis P. Robinson
Assistant Examiner—Archene A. Turner
Attorney, Agent, or Firm—Flehr, Hohbach, Test, Albritton & Herbert

[57] ABSTRACT

A process for the formation of alumina containing carbon fiber mats is provided. The process comprises dispersing an alumina precursor solution in the mat, converting the precursor to an insoluble hydroxide precipitate and hydrolizing the precipitate to form alumina nodules dispersed throughout the mat. Also provided is an alumina containing carbon fiber mat comprising carbon fibers and nodules of alumina, which are substantially uniformly dispersed throughout the mat, and a sodium sulfur cell having a sulfur compartment containing such a mat.

25 Claims, 2 Drawing Sheets

FORMATION OF ALUMINA IMPREGNATED CARBON FIBER MATS

BACKGROUND OF THE INVENTION

The present invention relates to the formation of alumina impregnated carbon fiber mats. Such mats can be used, for example, in the sulfur electrode of a sodium sulfur cell.

In the discharge operation of a sodium-sulfur electrochemical cell, metallic sodium is oxidized at its interface with an ionically conductive membrane, usually of the beta-alumina family. The resulting sodium cations pass through the beta-alumina membrane and enter the sulfur electrode. The electrons generated from the oxidation pass from the sodium to an external circuit by means of a current collector and they return to the sulfur electrode of the cell by means of another collector. In this process, sulfur is reduced to polysulfide.

Typically, carbon felt or graphite is distributed throughout the sulfur compartment or electrode to provide electrical conductivity. Sodium sulfur cells of the type just described have exhibited several problems. The sodium ions, which during discharge first appear in the sulfur electrode compartment at the beta-alumina membrane interface, are not distributed rapidly enough throughout the sulfur electrode compartment. Further, during recharging, the sodium ions within the sulfur electrode compartment must move back toward the beta-alumina interface, pass back through the beta-alumina membrane and be reduced back to metallic sodium at the beta-alumina-liquid sodium interface. The rate of sodium ion transport within the sulfur electrode has limited the practical thickness of this electrode and hence the capacity of the cell.

The relatively slow movement of the sodium ions in the sulfur compartment also limits reactant utilization, due to the formation of isolated pockets of sulfur and/or sodium polysulfide. The presence of sulfur deposits, as well as variations in beta-alumina wall thicknesses and carbon mat non-uniformities, can affect local current densities. See, *"The Sodium Sulfur Battery"*:, Edited by J. L. Sudworth and A. R. Tilley, 187-195, 1985, Chapman and Hall, London. Additionally, changes in the sulfur electrode reactant volume with state-of-charge can affect the sodium ion activity within the sulfur electrode compartment. The deleterious effects of this non-uniform behavior could be reduced if the movement of sodium ions were accelerated.

It is known that concentration polarization can be reduced in aqueous electrolytes by forced convection or stirring. This solution is impractical in sodium sulfur cells because of the porous nature of the sulfur electrode. Surface forces can be employed to aid transport through the carbon mat, by wicking or capillarity. It is also known that carbon surfaces are readily wet by elemental sulfur and not by polysulfides, whereas alumina surfaces are preferentially wet by sodium polysulfides. Therefore, it has been suggested that the use of a carbon fiber mat deposited with alumina should provide increased sodium polysulfide wicking and consequently improved transport within the sulfur electrode. See G. J. Janz and R. M. Murphy, Wettability of Some Carbon Surfaces by Molten Sulfur and Polysulfides, *J. Electrochem Soc.*, 125, 1605 (1978) and G. J. Janz et al, Wetting Properties of the Sulfur Electrode in Sodium-Sulfur Batteries, *J. Appl. Electrochem.*, 10, 789 (1980).

The formation of an insulating sulfur layer at the beta-alumina/sulfur electrode interface during recharging causes a large increase in cell resistance which shuts off the recharge reaction before all the sodium polysulfide can be converted to sulfur. This limits the reactant utilization. U.S. Pat. No. 4,084,041 issued to F. A. Ludwig discloses the use of oxide treated felt as a resistive layer adjacent to and contiguous with the cation permeable membrane, i.e., the beta-alumina tube. Alumina as a coating material is used to reduce wetting by sulfur and improve wetting by polysulfide. The larger objective was to permit, during recharging, oxidation of polysulfides to elemental sulfur rather than stopping the oxidation process at sodium pentasulfide, and in this way reactant utilization was improved. However, the use of an alumina-treated graphite felt was reported to yield an increased discharge cell resistance.

U.K. Patent No. 1528672 issued to Jones and Robinson discloses the use of carbon mats containing alumina, made by the process of mechanically mixing carbon fibers and alumina fibers together. Although high reactant utilization during prolonged cycling is achieved by this method, cell resistance is appreciably increased. See, for example, "The Sodium Sulfur Battery", edited by J. L. Sudworth and A. R. Tilley, pg. 187-195, Chapman and Hall, London (1985).

Thus, there is a need to reduce concentration polarization without increasing cell resistance in sodium-sulfur cells.

SUMMARY OF THE INVENTION AND OBJECTS

It is an object of the present invention to eliminate or reduce the concentration polarization and other related problems in the sodium sulfur cells without increasing the resistance of the electrode.

It is an additional object of the present invention to provide an improved method of incorporating alumina in a carbon fiber mat. It is a further object of the present invention to improve polysulfide wetting and wicking over that in carbon fiber mats without additives.

Further objects and features of the present invention will be apparent from the following description, and with reference to the figures, in which the preferred embodiments are set forth in detail.

In accordance with the above objects, a process is herein provided for dispersing alumina uniformly throughout a carbon fiber mat by means of chemical impregnation. Briefly, the process comprises dispersing an alumina precursor solution in the mat, converting the dispersed alumina precursor to an insoluble aluminum hydroxide intermediate, precipitating it in situ and pyrolizing the intermediate precipitate to form aluminum oxide nodules dispersed throughout the mat and bound to the mat fibers.

An improved carbon fiber mat is formed comprising carbon fibers and bound nodules of alumina dispersed substantially uniformly throughout the mat.

DETAILED DESCRIPTION OF THE PREFERRED EMBODIMENTS

Figure 2:
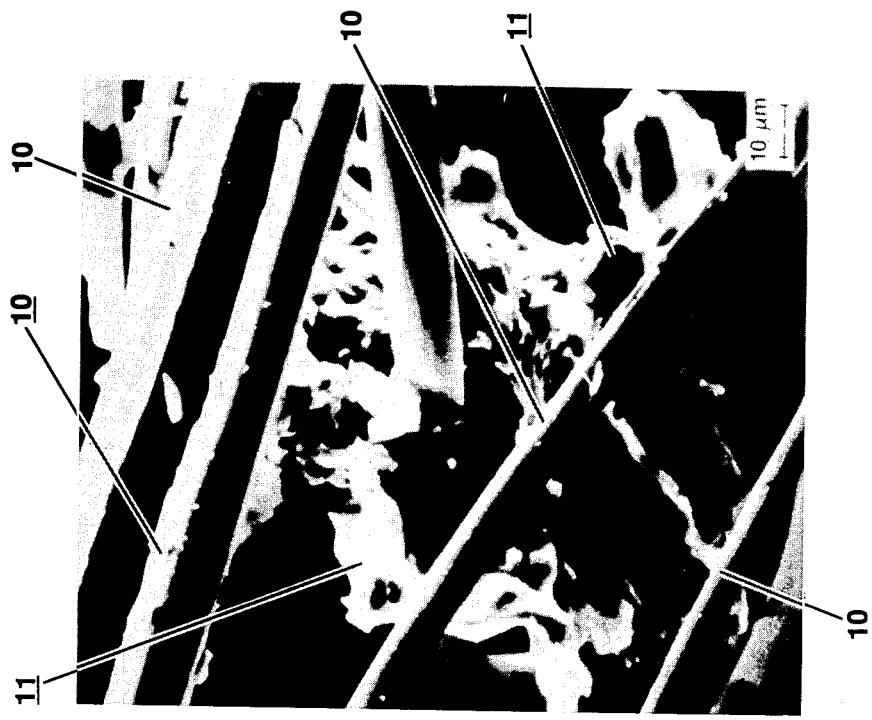
FIG. 2 is a magnification of a portion of the photomicrograph of FIG. 1, times 5.

In the first step of one embodiment of the process of the present invention, an alumina precursor solution is dispersed in a carbon fiber mat of the type known in the art. Such carbon mats include layered sheets of compressed carbon fibers formed into a planer array. Within each sheet, the carbon fibers are randomly oriented. For example, the carbon fiber mat manufactured by Union Carbide and sold under the trade designation "Thornel VMA" may be used. The mat is filled with the precursor, preferably by submersing the mat in a solution containing the precursor. The carbon fiber mat is substantially completely filled with solution, typically by immersion for 5 to 60 minutes.

Then, the mat is removed from the aluminum precursor solution.

Suitable aluminum precursors include either an aluminum salt or an aluminum alkoxide. The invention will be described first using aluminum salts. Suitable aluminum salts include, but are not limited, to aluminum sulfate, aluminum nitrate, mixed salts, e.g., aluminum ammonium sulfate, aluminum acetate or aluminum formate and hydrates thereof.

In the second step, the aluminum salt is converted to an insoluble hydroxide precipitate. This is preferably performed by placing the mat, which is saturated with the aluminum salt solution, in a solution containing a cationic hydroxide. Ammonium hydroxide is preferred because of its volatility and vapor pressure.. However, other cationic hydroxides may be used, e.g., sodium hydroxide.

Any solvent in which the aluminum precursor is soluble but which is inert to the fiber mat may be used. Suitable solvents for the salts include water and alcohols, e.g. methanol or ethanol.

Suitable concentrations for aluminum salts are in the range of 10g/L to saturation. The concentration of the solution may be varied depending upon the final alumina loading desired.

Any dilution of cationic hydroxide may be used, although a 1:1 dilution is preferred because it yields a controlled reaction, i.e., one which allows penetration of the hydroxide to the interior of the mat without closing off exterior pores. The aluminum hydroxide precipitate formed by the conversion of the aluminum salt will be dispersed throughout the mat.

In step three, the aluminum hydroxide precipitate in the mat is pyrolized to convert it to aluminum oxide. The mat is placed in a reducing or inert atmosphere and heated, at a sufficient temperature and for a sufficient period of time to convert the aluminum hydroxide to aluminum oxide.

Step three is carried out under a reducing or an inert atmosphere to avoid oxidation of the carbon fibers of the mat. A reducing atmosphere of hydrogen is suitable for this purpose. Alternatively, an inert gaseous atmosphere of argon may be used. Pyrolysis can be done at a temperature between about 300 to 1000 degrees centigrade. The conversion conditions are well known and need not be enumerated in detail here. Atmospheric pressure can be used.

A different procedure is used when the aluminum precursor is an aluminum alkoxide. It is preferably first distilled to obtain an unpolymerized reactant and then diluted with an organic solvent. Then, the carbon fiber mat is submersed in a solution containing a concentration of 10 to 95 percent of the aluminum alkoxide to completely fill the mat, the preferred range being 80–95 percent.

Suitable aluminum alkoxides include aluminum sec-butoxide or aluminum isopropoxide. Higher molecular weight alkoxides can be used but their higher viscosity makes them less desirable because it can lead to lack of uniformity of diffusion in the mat. Additionally, many of these higher weight alkoxides are solids and would therefore not be usable in the method of this invention.

The aluminum alkoxide impregnated mat is removed from solution and treated with heat, preferably in the form of steam. The steam causes the conversion of the alkoxide to the insoluble aluminum hydroxide precipitate which is dispersed throughout the mat. Steam is preferred because the vapor can easily penetrate the mat pores and yields aluminum hydroxide substantially uniformly dispersed throughout.

This hydrolysis step should be performed for 20–120 minutes at a temperature in the range of 20–100 degrees centigrade, sufficient to convert substantially all of the alkoxide to aluminum hydroxide precipitate.

Pyrolysis of the aluminum hydroxide precipitate is then carried out to convert the aluminum hydroxide to aluminum oxide in the form of nodules dispersed throughout the carbon fiber mat.

In a preferred optional procedure, the carbon fiber mat is dried before converting the aluminum hydroxide precipitate to aluminum oxide. This assists the conversion reaction.

This drying step may be carried out by applying a vacuum to the mat in the following manner. The mat is placed into a 30°–100° C. vacuum oven and the air is slowly evacuated. The mat is then allowed to sit 5–10 minutes in the evacuated oven. Air is then bled back into the oven, the oven is re-evacuated, and the mat is dried for 10–120 minutes.

Figure 1:
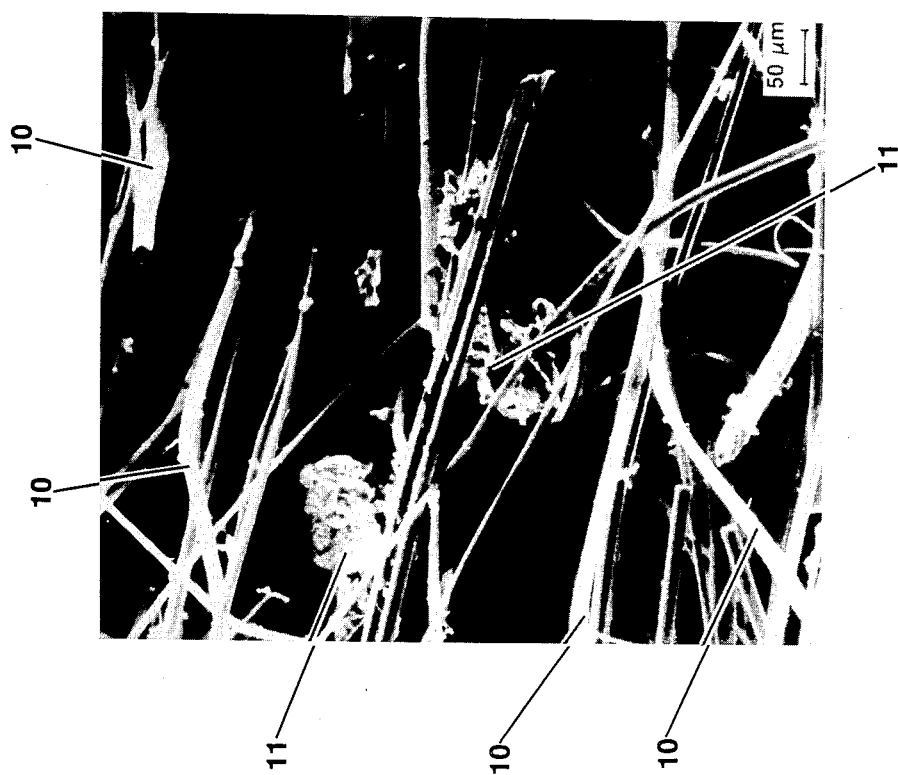
FIG. 1 is a photomicrograph of the carbon mat of the present invention, magnified 200 times.
Figure 3:
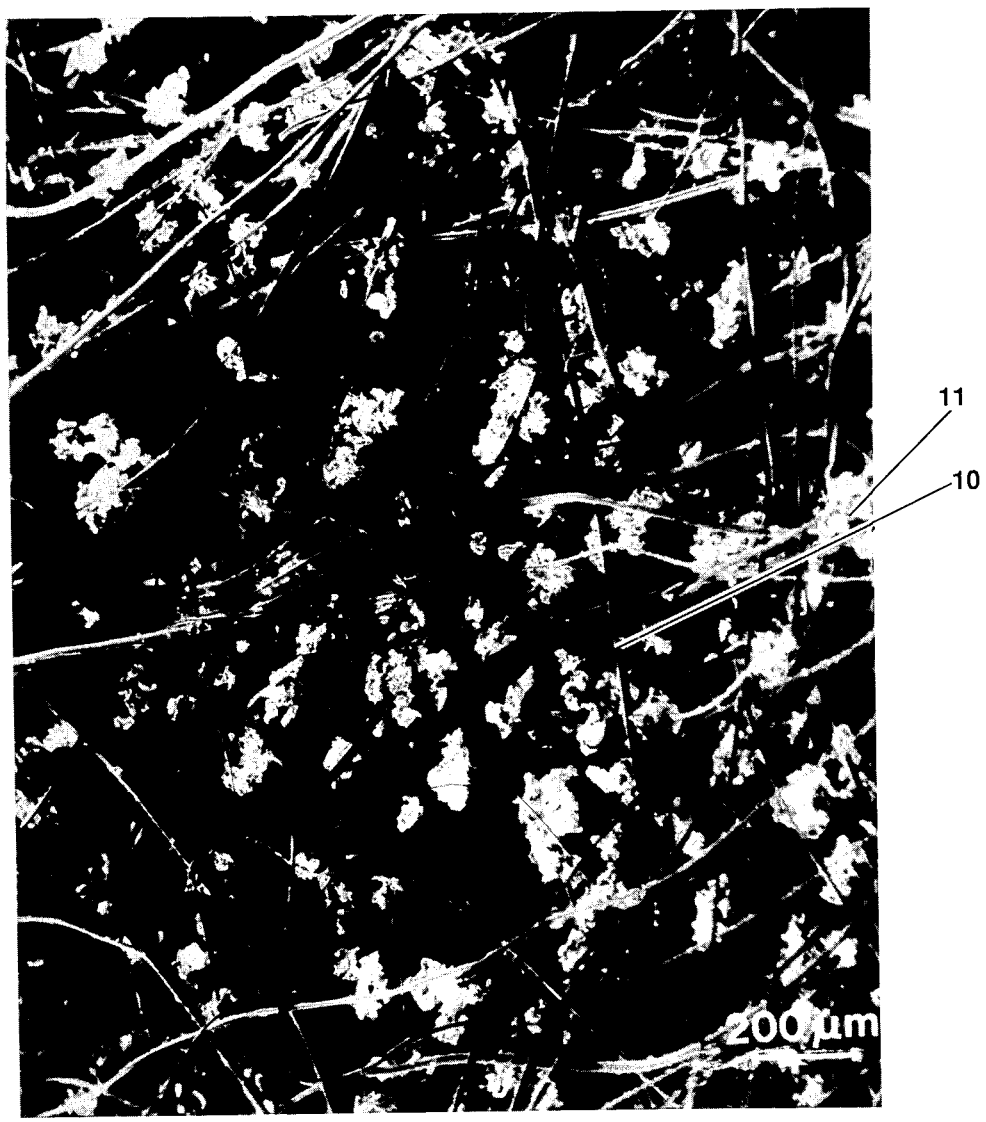
FIG. 3 is a photomicrograph of the carbon mat of the present invention, magnified 110 times.

Referring to FIGS. 1–3, there is shown, in magnified view, the carbon fiber mat of the present invention. The mat comprises carbon fibers, 10, interwoven with each other, in which alumina nodules, 11, are dispersed substantially uniformly. As can be seen, the nodules range in size from between about 10 microns to about 300 microns in size. The nodules adhere to the fibers of the mat, as best seen in FIG. 3, hence, they are substantially permanently affixed or bonded within the mat and are not easily dislodged by shaking or other similar disruption to the mat. Because the nodules adhere to the fibers of the carbon fiber mat, they will remain dispersed throughout the mat during packaging, shipment and use.

Although not visible in the photomicrographs, the carbon mat consists of a multi-planer structure. Within a plane, the carbon fibers are tightly woven forming an interlacing meshwork or network of carbon filaments which cross over and under one another throughout the mat in a random manner. This can best be seen in FIG. 1.

The alumina nodules which are deposited substantially uniformly throughout this mat are likewise oriented and arranged in random and multiplaner directions. The large and small nodules are randomly dispersed in all directions.

The nodules themselves, as best seen in FIG. 3, are inconsistent in outline and shape. They are generally globular to truncated cylindrical, but mostly of globular or roughly spherical form, having very rough surfaces and numerous indentations or cavities.

The present invention also comprises a sodium sulfur cell of the type previously known in the art, having a sulfur compartment containing a carbon fiber mat comprising carbon fibers and nodules of alumina dispersed substantially uniformly among the carbon fibers. Most sodium sulfur cells of prior art design employ a concentric cylinder arrangement. A closed end beta-alumina tube is placed inside a cylindrical cell housing. The sodium may either be inside or outside the beta-alumina tube. In the "sodium inside" design, the sulfur compartment lies between the beta-alumina tube and the cell housing, which also serves as the sulfur electrode current collector. In an alternative arrangement, the sulfur is contained within the beta-alumina tube and a concentric rod or pole serves as the sulfur electrode current collector. See, for example, "The Sodium-Sulfur Battery with beta-Alumina Electrolyte", by J. L. Sudworth and A. R. Tilley in "The Sulfur Electrode: Fused Salts and Solid Electrolytes", 1983, Academic Press, New York, Ragnar P. Tischer, Editor.

Included in the sulfur electrode is a high resistance layer, either a high resistance carbon or alumina mat, positioned adjacent to and contiguous with the cation permeable membrane. As described above, the purpose of the layer is to aid reactant utilization beyond sodium pentasulfide during cell recharging. See, for example, M. W. Breiter and B. Dunn, *J. Appl. Electrochem*, 9, 291 (1979).

In the present invention, the sulfur compartment of the sodium sulfur cell contains a carbon fiber mat having carbon fibers and alumina nodules substantially uniformly dispersed among the fibers. The nodules adhere to the fibers and are oriented and arranged in random and multiplaner manner. They are generally globular to truncated cylindrical in shape or roughly spherical, having very rough surfaces with numerous indentations or cavities. These nodules range in size from about 10 microns to about 300 microns in diameter.

Such an alumina containing carbon fiber mat comprising carbon fibers and nodules of alumina may be formed by dispersing aluminum hydroxide throughout the carbon fiber mat, precipitating the aluminum hydroxide and pyrolizing the aluminum hydroxide to form the alumina nodules within the mat. The carbon fiber mat made according to the above process will contain nodules of alumina substantially uniformly dispersed throughout the mat and ranging in size from about 10 microns to about 300 microns in diameter. These nodules will adhere to the filamentous carbon fibers, when made by the above process A further disclosure of the nature of the present invention is provided by the specific examples of the practice of the process of the present invention as set forth below. It should be understood that the data disclosed serve only as examples and are not intended to limit the scope of the invention.

EXAMPLE 1

A carbon mat intrafiber void volume is filled by immersion in a 0.16 molar aluminum sulfate solution, and a vacuum applied to help remove entrapped air and completely fill the void volume of the mat. The mat is removed from the solution, drained for 30 seconds, and the aluminum salt within the pore volume is converted to aluminum hydroxide by immersion in a solution containing 50% ammonium hydroxide. Again a vacuum is applied. Conversion of the aluminum hydroxide precipitate to aluminum oxide is then carried out by heating the mat under an atmosphere of 10% hydrogen/balance argon. The mat is heated at a temperature of about 450 degrees centigrade for about 3 hours initially, then the temperature is raised to about 1000 degrees centigrade for about 10 hours. Alumina loadings in the range of about 10≈80 wt% have been obtained by this method. The higher loadings can be achieved through multiple processing.

EXAMPLE 2

Distillation of aluminum sec-butoxide is performed under vacuum using techniques well known in the art. The distilled sec-butoxide precursor is then diluted with an inert solvent, in this example, n-hexane in a volume of 10%. After dilution the carbon fiber mat is immersed in the solution, and a vacuum applied as in Example 1. When the mat is completely filled with the precursor solution, the mat is removed from the solution, allowed to drain 30 seconds, and steam is applied to convert the precursor to the aluminum hydroxide precipitate. The mat is steam treated for a period of 1 hour. Pyrolysis is then carried out, as in Example 1 above. Using this method, alumina contents of between about 30–95 wt% have been obtained.

EXAMPLE 3

Several samples of alumina-containing carbon fiber mat were prepared in the manner described in Example 1.

The capillary or wicking properties of some of these were determined in a tubular glass test device in which a test mat was dipped into liquid sodium polysulfide for 60 minutes and the rise of this liquid was subsequently measured. Values for Sample 1a, prepared as described in Example 1, are presented in Table 1. A corresponding value for a control sample (sample 1b) not loaded with alumina, is also presented in Table 1. These results illustrate clearly the improvement in sodium polysulfide wicking brought about by loading with alumina by a method described in this application.

TABLE 1

| | Wicking Measurements | |
|---|---|---|
| Sample No. | Weight % alumina in composite mat | Rise of sodium tetrasulfide in wicking device - mm |
| 1a | 20 ± 2 | 40 |
| 1b | 0 (control) | less than 1 |

Electrical resistivity measurements were also carried out on composites, prepared as described in Example 1, for comparison with controls, not loaded with alumina, as well as with an alumina-carbon fiber composite prepared in a manner different from that described in this application. Measurements were carried out in a parallel electrode type of cell using platinum foil electrodes. The interelectrode spacing was 1.0 cm. Results are presented in Table 2.

Samples 2a, 2b, and 2c were prepared as described in Example 1, while Sample 2d was a control, not loaded with alumina. Values obtained on these samples show that the specific resistivity is hardly affected by alumina additions introduced by a method described in this application. There is no difference in resistivity, within experimental uncertainty, of controls and carbon mat loaded with alumina, by a method described in this application. There is no difference in resistivity between specimens loaded with 21 or 32 percent alumina.

In contrast, an alumina carbon fiber composite, sample 2e, was prepared by mechanical mixing of alumina and carbon fibers, with fiber lengths reduced to less than one mm, to allow an intimately mixed composite. The resistivity was roughly fifty times that of a composite prepared in a manner taught in this application. In comparison, the resistivity of carbon fiber broken down to lengths less than 1 mm but without an alumina addition, sample 2f, displayed a resistivity a few times that of composite prepared by a procedure described in this application. These results demonstrate that the method used to prepare an alumina-carbon fiber composite is critical in determining the electrical resistivity.

TABLE 2

Electrical Resistivity Measurements

Conditions: test temperature 250° C.
fiber loading 0.12 g carbon/cm$^3$

| Sample No. | Weight % alumina | Preparation method | Specific Resistivity ohm cm |
|---|---|---|---|
| 2a | 21 | Example 1 | .43 |
| 2b | 32 | Example 1 | .52 |
| 2c | 21 | Example 1 | .61 |
| 2d | 0(Control) | Example 1 | .47 |
| 2e | 50 | Mechanical mixing of carbon and Saffil alumina fibers less than 1 mm long | 17 |
| 2f | 0 | Carbon fibers less than 1 mm long | 2.0 |

EXAMPLE 4

A laboratory cell was fabricated having alumina impregnated sulfur electrodes made in accordance with the process of the present invention. The cell contained about 22 wt% alumina with respect to the combined alumina-carbon mat weight. This carbon fiber mat was treated once with 0.16 molar aluminum sulfate using the procedure set forth in Example 1. The cell had a discharge and charge resistance of about 45 milliohm compared to 40 to 50 for similarly built cells lacking alumina. Power efficiency for the alumina doped cell was 91–93%, contrasted to 90–92% for untreated cells. Capacity, i.e., reactant utilization, was unaffected. Under standard test conditions, 108 mA/cm$^2$ at 330 degrees centigrade, the alumina containing cell displayed about 80% of the concentration polarization of an untreated cell. In other words, open circuit voltage deviation from the ideal is improved by approximately 20%.

What is claimed is:

1. A process for the formation of an alumina containing carbon fiber mat comprising:
   a. dispersing an alumina precursor solution in said mat;
   b. converting said dispersed alumina precursor to an insoluble hydroxide precipitate; and
   c. pyrolizing said aluminum hydroxide precipitate to form alumina nodules dispersed throughout said mat.

2. The process according to claim 1 wherein said alumina nodules are adhered to said mat.

3. The process according to claim 1 wherein said alumina precursor is an aluminum salt.

4. The process according to claim 3 wherein said aluminum salt is selected from the group consisting of aluminum sulfate, aluminum nitrate, aluminum acetate and aluminum formate.

5. The process according to claim 3 wherein said aluminum salt is aluminum sulfate.

6. The process according to claim 1 wherein said alumina precursor is an aluminum alkoxide.

7. The process according to claim 6 wherein said aluminum alkoxide is diluted with an organic solvent before dispersion in said mat.

8. The process according to claim 6 wherein said aluminum alkoxide is aluminum sec-butoxide.

9. The process according to claim 6 wherein said aluminum alkoxide is aluminum iso-propoxide.

10. The process according to claim 3 wherein said aluminum salt is converted to said insoluble hydroxide by the addition of a cationic hydroxide.

11. The process according to claim 10 wherein said cationic hydroxide is ammonium hydroxide.

12. The process according to claim 6 wherein said aluminum alkoxide is converted to said insoluble hydroxide by heating.

13. The process according to claim 12 wherein said heating is performed by contact with steam.

14. The process according to claim 1 additionally comprising the step of drying said mat after precipitating said aluminum hydroxide.

15. The process according to claim 1 wherein step (a) is performed by submerging said mat in said alumina precursor solution.

16. The process according to claim 14 additionally comprising the step of applying a vacuum to said mat after submersion in said alumina precursor solution.

17. An alumina containing carbon fiber mat formed by the process of claims 1 or 12.

18. An alumina containing carbon fiber mat comprising carbon fibers and nodules of alumina, said nodules being formed by dispersing an aluminum hydroxide throughout said mat, precipitating said aluminum hydroxide and pyrolizing said aluminum hydroxide to form alumina nodules within said mat.

19. A carbon mat comprising carbon fibers and nodules of alumina, said nodules being substantially uniformly dispersed throughout said mat.

20. The carbon mat according to claim 19 wherein said nodules are between about 10 and 300 microns in diameter.

21. The carbon mat according to claim 20 wherein said nodules adhere to said carbon fibers.

22. A sodium sulfur cell having a sulfur compartment containing a mat, said mat comprising carbon fibers and nodules of alumina dispersed substantially uniformly among said fibers.

23. The cell of claim 22 wherein said nodules adhere to said fibers.

24. The cell of claim 23 wherein said nodules fall in the range of about 10 to 300 microns in diameter.

25. The cell of claim 24 having an electrical resistivity substantially equivalent to a sulfur cell not containing a carbon fiber mat.

* * * * *

UNITED STATES PATENT AND TRADEMARK OFFICE
CERTIFICATE OF CORRECTION

PATENT NO. : 4,944,991

DATED : July 31, 1990

INVENTOR(S) : Karas, B., et al.

It is certified that error appears in the above-identified patent and that said Letters Patent is hereby corrected as shown below:

Column 8, line 62, following "equivalent to a" insert --sodium--.

Signed and Sealed this

Thirtieth Day of June, 1992

Attest:

DOUGLAS B. COMER

Attesting Officer

Acting Commissioner of Patents and Trademarks